F. HABER & R. LEISER.
METHOD AND APPARATUS FOR TESTING GASES.
APPLICATION FILED APR. 30, 1914.
1,269,599. Patented June 18, 1918.
4 SHEETS—SHEET 1.
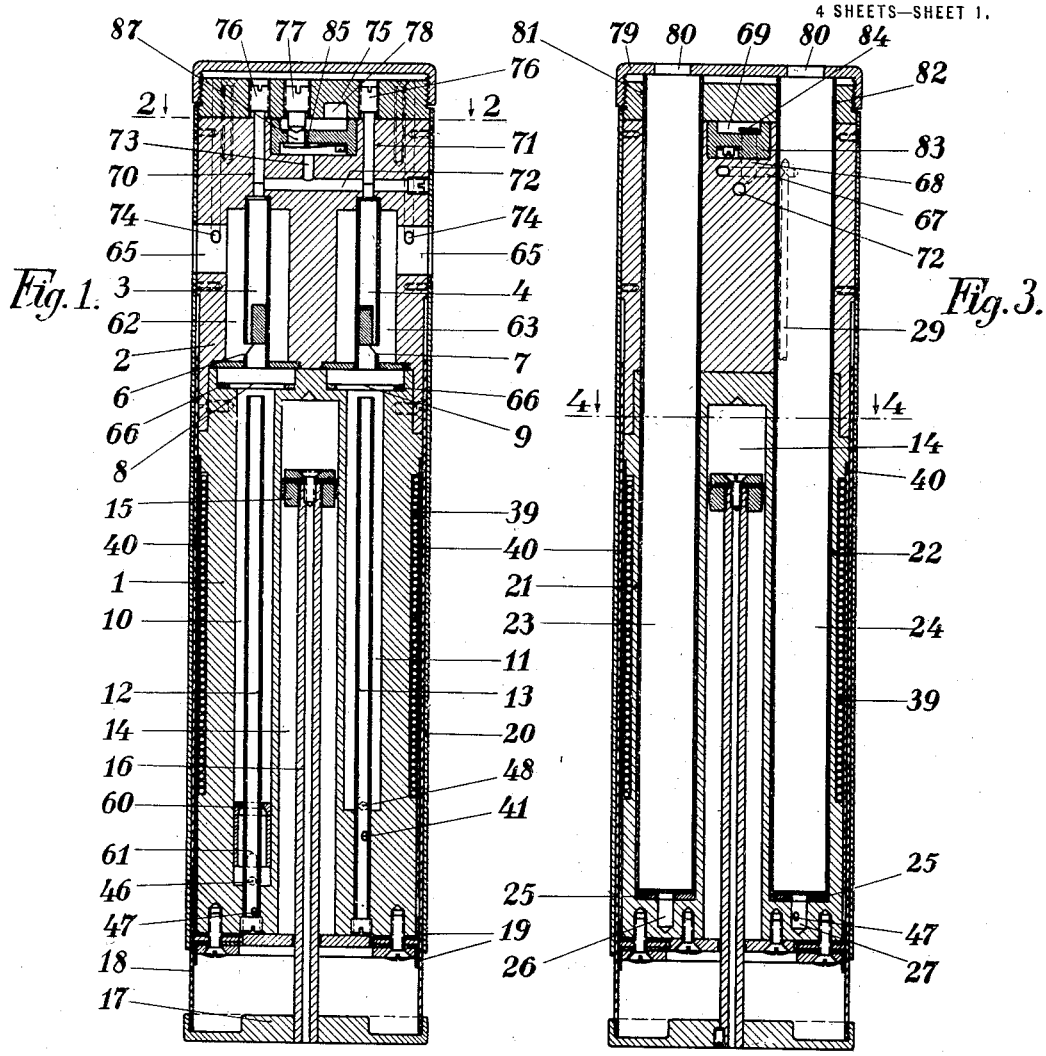
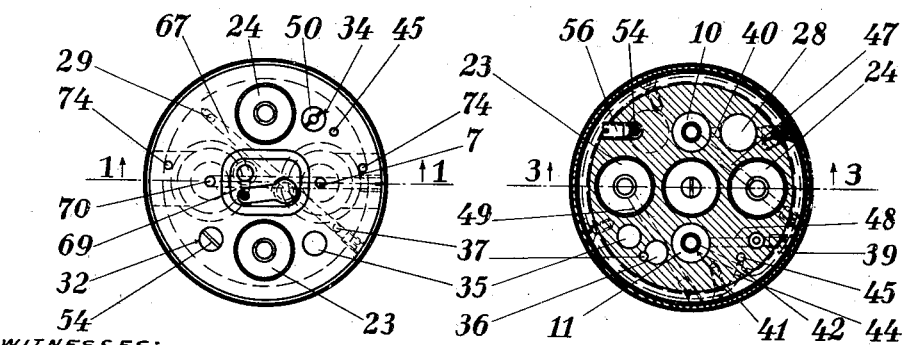
WITNESSES:
G. V. Rasmussen
George Du Bon
INVENTORS
FRITZ HABER & RICHARD LEISER
BY
ATTORNEYS F. HABER & R. LEISER.
METHOD AND APPARATUS FOR TESTING GASES.
APPLICATION FILED APR. 30, 1914.

1,269,599.

Patented June 18, 1918.
4 SHEETS—SHEET 2.

WITNESSES:
G. V. Rasmussen
George Du Bon

INVENTORS
FRITZ HABER & RICHARD LEISER
BY
Bressee Knauth
ATTORNEYS

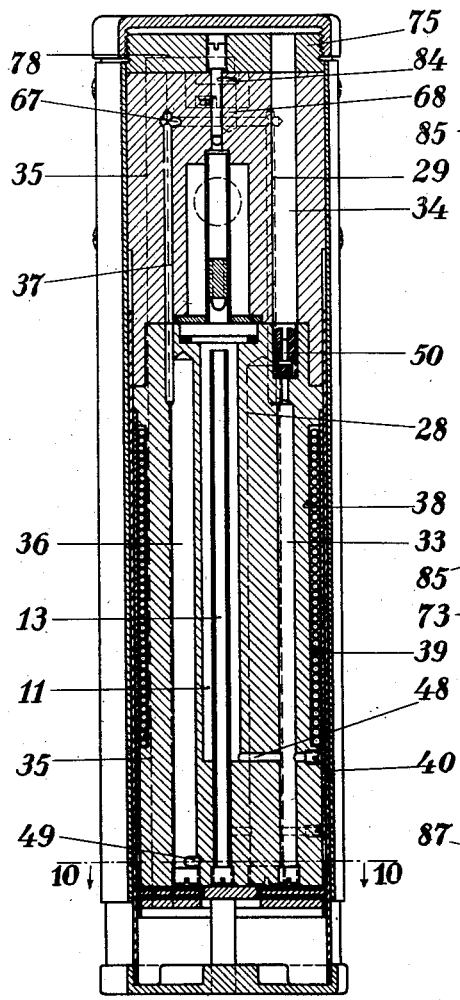

F. HABER & R. LEISER.
METHOD AND APPARATUS FOR TESTING GASES.
APPLICATION FILED APR. 30, 1914.

1,269,599.

Patented June 18, 1918.
4 SHEETS—SHEET 4.

WITNESSES:
George Du Bon
Ralph E. Clayton

INVENTORS
FRITZ HABER
RICHARD LEISER
BY
Brown Schrenk
ATTORNEYS

UNITED STATES PATENT OFFICE.

FRITZ HABER AND RICHARD LEISER, OF BERLIN-DAHLEM, GERMANY.

METHOD AND APPARATUS FOR TESTING GASES.

1,269,599.  Specification of Letters Patent.  Patented June 18, 1918.

Application filed April 30, 1914. Serial No. 835,419.

*To all whom it may concern:*

Be it known that we, FRITZ HABER, a citizen of Germany, and RICHARD LEISER, a citizen of Austria, both residents of Berlin-Dahlem, Germany, have jointly invented certain new and useful Improvements in Methods and Apparatus for Testing Gases.

This invention relates to the method of tracing or determining admixtures or variations of compositions of gases by means of the tone vibrations (beats) of two pipes and has for its object to render the method simpler and more expeditious and relates further to an apparatus suitable for carrying the method into effect being handy and easy to use especially in mines.

The following is a full, clear and exact description, such as will enable others skilled in the art to which it appertains to use the method and make and use the apparatus, reference being had to the accompanying drawings forming part of this specification, in which—

Figures 1, 3, 5, 7 and 9 are vertical sections of the entire apparatus, Figs. 2, 4, 6, 8 and 10 cross sections, Fig. 7 an elevation partly in section, Fig. 11 a bottom view of a detail of the apparatus, Fig. 12 an elevation of same and the surrounding parts in vertical section and Fig. 13 a top view of the detail. The three latter figures are drawn on a larger scale than the Figs. 1 to 10.

Figure 5:
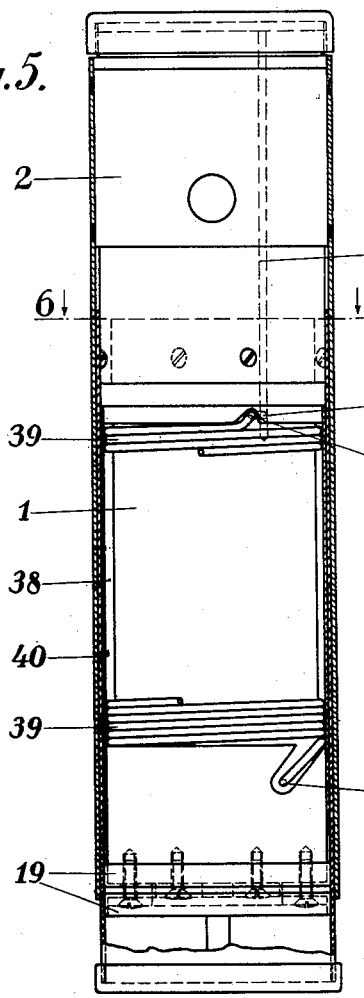
Figure 7:
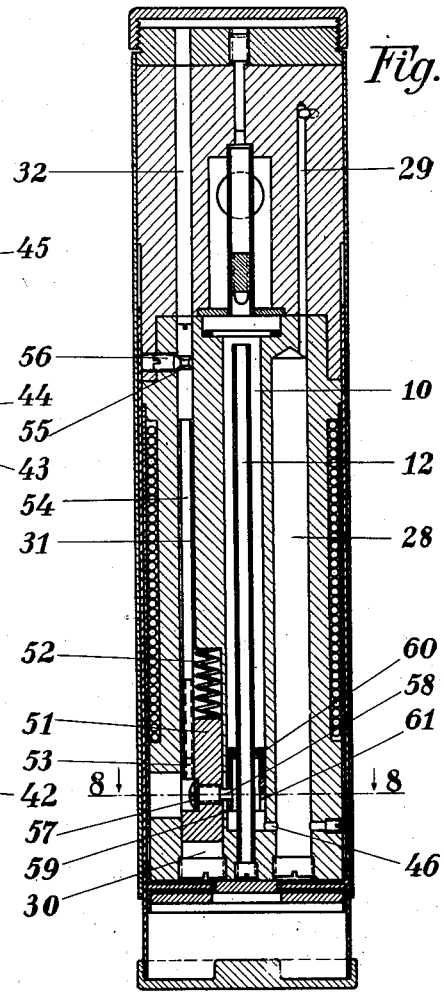
Figure 6:
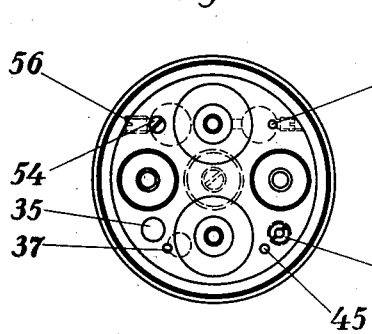
Figure 8:
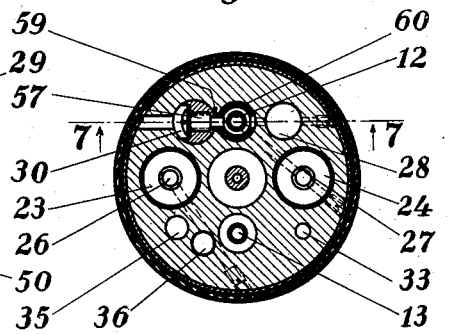

It is known that a chemical impurity of the air can be determined by acoustics, the vibrations (beats) being observed, which are produced by two pipes of the same pitch, when one is blown with the contaminated air and the other with pure air. According to this method, however, it is a condition that two gas currents, namely, a current of pure air and a current of contaminated air, are available where the examination is made. This condition cannot be easily fulfilled so far as an examination of mine-air with regard to contaminations is concerned. It is true that a large storage tank with pure air can be taken down to the place where the examination is to be made and a circuit can be formed, wherein the current of pure air used for blowing the one pipe is again returned to the storage tank, but a portable and handy apparatus is not rendered available in this manner.

The use of two different air currents for blowing the two pipes of the same pitch, which is characterized by the older method can be avoided, as has been proved by experiments. A stopped labial pipe also produces a tone, when an easily adjustable diaphragm is stretched out in the interior of the pipe body and extends transversely to the axis thereof, such diaphragm effecting a gastight shutting-off of a certain part of the pipe body from the remaining part thereof. The said tone depends on the filling or contents of the gas tight shut-off space of the chamber and becomes deeper or higher during the variation of the said filling, according as the density of the filling gas undergoes an increase or decrease. The larger the part of the pipe shut-off by the diaphragm, the more important the variation of the filling gas for the variation of the tone of the pipe. If the diaphragm is stretched closely behind the lip and a gas A is exchanged for a gas B in the chamber, the blowing of the pipe with an unvariable gas current will vary the tone almost to the same extent as when a pipe not provided with a diaphragm—is blown first with the gas A and then with the gas B. This property or characteristic can be utilized for determining the variation of the composition of a gas with the aid of two pipes, one pipe being designated the experimental pipe and the other the comparison pipe. The experimental pipe is provided in all cases with a partition, which divides its vibration-chamber. For the comparison pipe, such partition is not fundamentally necessary but is practically advisable. In contradistinction to former proposals, both pipes are blown with the same gas current. Care should be taken on account of the fact that differences in temperature of both pipes also have the same effect as differences in the chemical composition of the gas. Differences of pressure are not of fundamental but of practical importance, because the pitch of the tone is influenced by a variation in the tension of the partition. If only differences in the chemical composition are to be determined, provision should therefore be made that pressure and temperature in the shut-off gas chamber of the experimental pipe have the same values as in the comparison pipe. The chamber will be combined with a small elastic bag or an open capillary tube will be fixed to the chamber, said tube being too narrow for allowing of a considerable diffusion within the time concerned for the use but insuring pressure equilibrium in the case of variations of the atmospheric pressure and the temperature of the pipes. The partitions, which may be selected, are very manifold. A caoutchouc diaphragm or any other soft elastic material such as collodion or gold-beater's skin may be used. Experiments have shown that hard elastic material, such as mica, may also be used, the partition being made of a thin elastic plate of such rigid material. The dependency of the pitch of the tone on the gas filling of the shut-off chamber is also maintained when the diaphragm exerts through its own mass and elastically a positive influence on the absolute pitch of the tone of the pipes.

For the special case of tracing mine-gas in the mine, the pipes are preferably used in such a manner that a small quantity of ordinary atmospheric air is carried in the chamber of the experimental pipe, while mine-air from the place where the examination is made is passed into the chamber of the comparison pipe, after having withdrawn, through the medium of suitable absorbing apparatus the varying quantities of carbonic acid and steam. The mine-air with or without the removal of carbonic acid and steam is used for blowing both pipes. The number of vibrations (beats) of the pipes then indicates the contents of methane. In the same sense as an increase of the methane, a decrease of the oxygen and increase of the nitrogen in the air acts on the apparatus but the sensitiveness for this variation is much less. If it is intended to examine mine-air as to carbonic acid, the chamber of one pipe is filled with the dried mine-air not freed from carbonic acid, while the chamber of the other pipe is filled with mine-air, from which steam and carbonic acid have been withdrawn.

For determining admixtures and variations of composition in gases in other cases the instrument is used in a similar manner.

The quantitative determination of the difference of composition is attained in the following manner. A device is provided on one of the two pipes for varying its length and the variation, which one must make in order to eliminate the vibrations, is read off an empirically calibrated scale.

If the method is employed in order to trace or determine admixtures or variations of composition of gases especially in mines by means of a portable apparatus, the circumstance that the pitch of the two pipes tends to vary irregularly with the pressure of the blowing gas current is a drawback. This variation in the influence of the blowing pressure on the pitch is characterized by the distinctive feature that the two pipes produce a different number of vibrations per unit of time when the pressure of the blowing gas current is different.

According to the invention, this drawback will be obviated when the pipes are made long and an overtone is blown by the single air or gas current, provision being simultaneously made for equalizing the irregular influence of the blowing strength on the pitch of the two pipes. This is preferably effected in such a manner that the width of the blowing gap or the gas passage leading thereto is adapted to be varied for the one pipe or for both pipes by the provision of throttling means. By a suitable adjustment thereof, the effect is attained that the two pipes, when sounding in unison at a certain strength of the blowing current or making a certain number of vibrations (beats) also maintain these qualities in connection with the practically concerned variations of the pressure of the blowing current.

In some cases, it is sufficient, instead of the throttling provided for in the two branch pipes, to let the blowing air current, which is the same for both pipes, pass through a pressure regulator, behind which the air current branches off to the two pipes.

Since the pressure regulators, which are adapted to be fitted in a handy apparatus for fire-damp indicators, are frequently not sufficient for completely removing the variations of the blowing current, it is advisable to provide, besides the pressure regulator, also the above-mentioned means, i. e. the throttling of the gas current in one or two branch pipes leading to the pipes.

An apparatus adapted to serve in the described manner for tracing or determining admixtures or variations of composition in gases and especially in mine-air by tone vibrations (beats) is shown in the accompanying drawings.

The essential parts of the apparatus are the bottom piece 1 and the top piece 2, which are formed, for instance, of aluminium or brass. In the latter are the two pipes (whistles) 3 and 4 with the lips 6 and 7. Behind the lips are arranged the diaphragms 8 and 9 consisting, for instance, of mica. In the bottom piece 1 are the bores 10 and 11 serving as pipe tubes for the pipes 3 and 4. In the pipe tube 10 is secured a narrower tube 12 and in the pipe tube 11 a narrower tube 13. These narrower tubes 12 and 13 are open close to the diaphragms and closed at the other end. A bore 14 is also provided in the bottom piece 1. It serves as cylinder for the piston 15 carried by the piston rod 16. The latter is secured in the cover 17 screwed on to the sleeve 18. The packing collars 19 arranged on the lower surface of the bottom piece 1 bear air-tight against the inner wall of the sleeve 18. In order to facilitate the handling of the apparatus during use, a sleeve 20 is provided, which is secured on the top piece 2 by countersunk screws.

In the bottom piece 1 are two bores 21 and 22, in which two metal tubes 23 and 24 are inserted, which have perforated bottoms. These tubes, hereinafter designated cartridges, are filled with chemicals, such as soda lime, which are adapted to absorb steam and carbonic acid. The chemicals do not fill the cartridges completely, so that space is left above same for receiving dust-retentive substances, such as cotton wool or glass wool. The cartridges 23 and 24 are mounted on caoutchouc rings 25. The bores 21 and 23 are adjoined by short narrower bores 26 and 27.

There is also a bore 28 in the bottom piece 1 and the passage 29, which extends partly in the bottom piece 1 and partly in the top piece 2 communicates with the said bore 28.

From the bottom side of the bottom piece 1 reaches further the bore 30, which contains the device for tuning the pipes and which is extended in the bore 31. The bore 32 corresponds thereto, which is in the top piece 2.

The bore 34 in the top piece 2 corresponds to the bore 33 in the bottom piece 1.

The bore 35 extends through the bottom piece 1 and the top piece 2.

A further axially directed bore 36 in the bottom piece 1 extends in the bore 37 in the top piece 2.

The bottom piece 1 is provided with a very wide but not deep groove 38, in which is provided a capillary tube 39 (thin brass tube). The capillary tube 39 is covered by a tube 40 slipped over same and secured to the bottom piece 1. The one end of the capillary tube 39 communicates at 41 with the tube 13 in the pipe tube 11. It is inserted through the bore 42 provided in the bottom piece 1 and soldered and calked. The other end of the capillary tube is secured at 43 in a small passage 44 of the bottom piece 1 in the same manner. A bore 45 extends from the passage 44 through the bottom piece 1 and the top piece 2.

Communication is established between the pipe tube 10 and the bore 28 by the small bore 46.

The bore 47 connects the tube 12 in the pipe tube 10 and the bore 27 below the cartridge 24.

The bore 48 communicates with the pipe tube 11 at the bottom and leads to the bore 33.

The bore 49 leads from the bore 36 to the bore 26 below the cartridge 23.

The bore 33 is shut off by a screw 50. This screw is bored transversely and also partly longitudinally, so that air can pass through the passage 34 through the screw into the bore 33 when the screw has been turned back a few threads.

There is provided in the bore 30 a cylindrical block 51 on which a spring 52 acts. In the block 51 a thread 53 is cut with which the spindle 54 engages. The latter is secured in position by means of a groove 55 in which the end of the screw 56 extends. There is also a screw 57 secured in the block 51, such screw reaching with its extension 58 through the longitudinal hole 59 and acting on the cylinder 60 adapted to slide in the pipe tube 12. The cylinder 60 is provided at its lower end with a small slot 61, so that it cannot close the bore 46 in its lowest position—it embraces the tube 12 with play.

The pipes 3 and 4 are surrounded in the top piece 2 by hollow spaces or cavities 62 and 63, which with the sound openings or apertures 65 communicate with the open air. They are of such dimensions that they act as resonators and cause the pipes when blown to immediately emit the overtone.

The diaphragms 8 and 9 are mounted on caoutchouc rings 66 and are secured thereon for instance by glycerin.

The two bores 29 and 37 communicate with each other through a transverse bore 67. The short vertical bore 68 communicates with the bore 67. The bore 68 communicates with the valve chamber 69.

The top piece 2 is also provided with the two bores 70 and 71, the bore 72 and the bore 73 leading to the valve chamber 69.

The head plate 75 is mounted on the top piece 2. The screws 76 and 77 are provided in the head plate 75. The pin-shaped extensions of the screws 76 engage in the bores 70 and 71 in the top piece 2.

There is also formed in the head plate 75 the passage 78, which leads from the valve chamber 69 to the bore 35.

In the head plate 75 bores are provided corresponding to the bores 23, 24, 32, 34, 45 and 74 in the top piece 2.

The cover 79 with the two apertures 80 is mounted on the head plates 75. The cartridges 23 and 24, for which the bores 81 and 82 are provided in the head plate, are secured in position by the cover 79.

The valve body 83 is provided in the valve chamber 69. The valve body 83 carries two valves 84 and 85, which are arranged over the apertures 86 and 87. The valves consist in well known manner of small metal plates secured to plate springs. The aperture 86 in the valve carrier 83 communicates with the bore 68 in the top piece 2. The conical abutment of the screw 77 extends into the aperture 87.

As is shown in the accompanying drawings, the bores are closed at their ends in known manner by screw plugs. The top piece 2 is secured to the bottom piece 1 by countersunk screws. The head plate 75 is secured to the top piece 2 in the same manner. The cover 79 is screwed on to the head plate 75.

The described apparatus operates in the following manner:

If the sleeve 18 is drawn out of the sleeve 20, two courses can be followed by the air for entering the vacuum chamber formed in the interior of the sleeve 18. One course is the following: through one of the holes 80 in the cover 79, through the cartridges 23, the bores 26, 49, 36 and 37 to the transverse bore 67. The second course leads through the other hole 80 in the cover 75, the cartridge 24 and the bores 27, 47, the tube 12, the pipe tube chamber 10, through the bores 46, 28 and 29, the latter communicating with the transverse bore 67. The bore 67 leads to the bore 68 communicating with the hole 86 in the valve carrier 83. The valve 84 is opened, because partial vacuum is behind the same. The valve 85 is subjected to suction for the same reason and closes the aperture 87. The gas or air currents passing through the two cartridges 23 and 24 and meeting again in the transverse passage 67 consequently pass the valve 84, pass into the passage 78 of the head plate 75 and finally reach through the bore 35 the suction chamber within the sleeve 18.

When drawing out the sleeve 18, vacuum is created through the piston 15 in the cylindrical bore 14, so that when releasing the sleeve 18, the latter is again returned to the original position by the pressure of the atmosphere. The air of the surroundings drawn in the sleeve 18, is now forced through the bore 35 and the passage 78 to the valve chamber 69, whereby the valve 84 is closed and the valve 85 is opened. The air passes through the bores 73, 72, 70 and 71 into the pipes (whistles) 3 and 4 and causes same to produce a sound.

The pipe tube 11 is filled with the comparison-gas, such as pure air, and for the above-mentioned reasons, it communicates with the surroundings. The communication is established by the tube 13, the bore 41, the capillary tube 39, the passage 44, the bore 45 and the two bores 74.

From time to time, perhaps every week, the cover 79 is removed, the screw 50 loosened and a suction device connected to the passage 45. There is placed in front of the passage 34 a dust filter and a receptacle containing soda lime, so that dry air freed from carbonic acid and dust is drawn in the capillary tube 39 and the pipe tube 11.

The tuning of the two pipes (whistles) 3 and 4 takes place after removing the cover 79 by turning the spindle 54, whereby the block 51 and the cylinder 60 are adjusted.

If the cylinder 60 is moved upward, the tone of the pipe will be of higher pitch and if the cylinder is moved downward, the tone of the pipe will be of lower pitch.

By means of the screw 77, which extends in the aperture 87 of the valve carrier 83, the blowing gas or air current can be throttled in such a manner that the pressure is formed for blowing the pipes. This pressure must be so proportioned that the pipes produce a pure tone of the desired pitch, for example, the second overtone with about 3000 vibrations per second.

The extensions of the screws 76, which reach into the branch passages 70 and 71, allow of a thottling in these passages, whereby the pressure of the blowing gas or air current for the two pipes can be varied somewhat, so that it is possible to render the increase of the pitch of the tone equivalent to the blowing pressure of both pipes, because this increase varies with a certain pipe for different pressures.

During the suction by drawing out the sleeve 18, two ways are provided for the inflowing gas or air in order that the whole quantity of gas or air required for blowing need not be drawn through the pipe tube 10, so that the suction can take place slowly through the pipe tube 10. Over-pressure or partial vacuum is avoided in the tube and nevertheless sufficient gas or air is available for blowing the pipes.

If a gas pressure regulator is used, the head plate 75 may be replaced by a similar head having thereon a pressure regulator of the usual or any preferred type. In this case the passage 78 does not communicate with the valve chamber 69 but only with the pressure regulator and a pipe leads from the regulator into the valve chamber 69. The throttle screw 77 can then be dispensed with.

Figure 14:
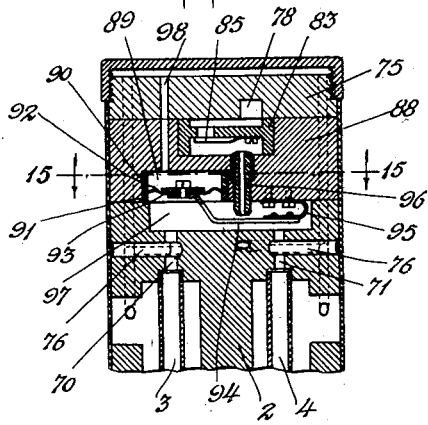
Fig. 14 is a section on the line 14—14 of Fig. 15 and represents the upper part of the apparatus shown in Fig. 1.
Figure 15:
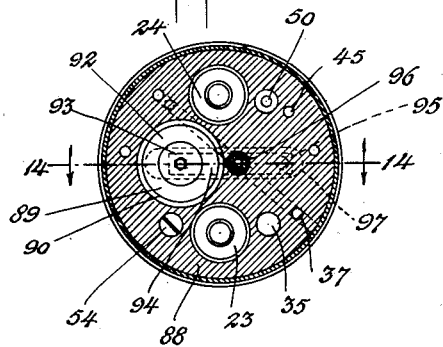
Fig. 15 is a section on the line 15—15 of Fig. 14.

Instead of strangling the blast of air at the aperture 87 it can be permitted to flow through a pressure regulator which maintains the pressure in the bores 70 and 71 constant until the end of the blast. This pressure regulator is shown in Fig. 14. Between the top piece already described and the head plate 75 is provided an intermediate member 88 having a recess 89 in which are located rings 90 and 91. In the recess 89 are also located the valve body 83 and the main portion of the pressure regulator. A membrane 92 of gold beater's skin is streached across the recess 89 and held in place between the rings 90 and 91. On each side of this membrane and at the central portion thereof are clamped two plates 93. In the head piece 2 is formed an elongated opening 97 with which the bores 70 and 71 leading from the pipes 3 and 4 communicate. A lever 94 is located in the elongated opening 97 and has one end secured to the spring 95 and the other end secured to the plates 93 above mentioned. The flat spring 95 normally tends to press the membrane 92 downwardly. The lever 94 also acts as a closure valve for the nozzle 96. Screws 76 are located in the top piece 2 and act to strangle the bores 70 and 71. The strangling screw 77, also the bore 72 shown in Fig. 1, are here eliminated. The bore 98 connects the recess over the membrane with the outside air. On blowing the pipes the air from the pump passes through the bore 78, the valve 85 and the nozzle 96 in the recess below the membrane 92, producing a gas pressure which increases until the membrane overcomes the force of the spring 95 and pulls lever 94 upwardly. By this action the lever automatically closes the nozzle 96 so that the pressure in the room 97 equals the pull of the spring. A constant blast is thus maintained in the pipes.

The dimensions of the apparatus are such that with drawn-in sleeve 18, the whole length is about 9" and the diameter is about 2¼".

We claim:

1. The method of tracing or determining admixtures or variations of composition of gases by means of tone vibrations which consists in confining portions of the gases to be compared in separate chambers closed by diaphragms then producing tone vibrations in front of each of said diaphragms and comparing the resultant tones.

2. The method of tracing or determining admixtures or variations of composition of gases by means of tone vibrations which consists in taking samples of the two gases confining them in separate chambers each with an elastic wall then producing tone vibrations against the elastic walls of both chambers and comparing the resultant tones.

3. The method of tracing or determining admixtures or variations of composition of gases by means of tone vibrations which consists in confining samples of the gases to be compared in separate chambers one wall of each chamber comprising an elastic diaphragm, then simultaneously passing tone producing currents of one of the gases in front of both of said diaphragms and comparing the resultant tones.

4. The method of tracing or determining admixtures or variations of composition of gases by means of tone vibrations which consists in confining a sample of a standard gas in a tubular chamber one end wall of which is an elastic diaphragm, introducing a sample of the gas to be tested into a similar chamber with a diaphragm then setting up tone vibrations in front of said diaphragms and comparing the resultant tones.

5. The method of tracing or determining admixtures or variations of composition of gases by means of tone vibrations which consists in confining samples of the gases to be compared in separate tubular chambers, one wall of each chamber comprising an elastic diaphragm then blowing currents of one of the gases past said diaphragm thereby producing tone vibrations adapted to be affected by the confined gases back of the diaphragms, and comparing the resultant tones.

6. The method of tracing or determining admixtures or variations of composition of gases by means of tone vibrations which consists in confining samples of the gases to be compared in separate tubular chambers, one wall of each chamber comprising an elastic diaphragm, said samples being maintained at the same temperature and pressure, then producing in front of said diaphragms, uniform vibrations adapted to produce musical tones and comparing said tones by observing the beats.

7. The method of tracing or determining admixtures or variations of composition of gases by means of tone vibrations which consists in confining samples of the gases to be compared in separate adjoining chambers each provided with an elastic diaphragm wall, then simultaneously producing musical tones in front of said diaphragms and comparing the tones produced by counting the beats.

8. The method of tracing or determining admixtures or variations of composition of gases by means of tone vibrations which consists in confining samples of the gases to be compared in separate chambers each provided with an elastic diaphragm wall then passing currents of one of the gases in front of the respective diaphragms to produce tone vibrations, the respective currents being throttled or controlled to vary the tone vibrations, and comparing the tone effect of the confined gases.

9. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, and means for blowing said pipes to produce tone vibrations.

10. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of each of said pipes, said diaphragm shutting off the rear parts of the respective pipe bodies from the parts next to the lips, and means for blowing said pipes to produce tone vibrations.

11. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes said diaphragm shutting off the rear part of the pipe body from the part close to the lip, and a single feed passage adapted to supply gas for blowing both of said pipes to produce tone vibrations.

12. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes said diaphragm shutting off the rear part of the pipe body from the part close to the lip, a single feed passage adapted to supply gas for blowing both of said pipes to produce tone vibrations and means for throttling said passage.

13. In an apparatus for tracing or determining admixtures or variations of composition of gases by means of the tone vibrations of two pipes, the combination of two pipes mounted in coöperative relation, one of said pipes being adapted to contain a standard gas, means in the lip end of said pipes for producing tone vibrations by currents of gas, a gas tight diaphragm stretched transversely of the axis of one of said pipes said diaphragm shutting off the rear part of the pipe body from the part close to the lip, a single feed passage adapted to supply gas for blowing both of said pipes to produce tone vibrations and means for regulating the pressure of the blowing gas.

14. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes said diaphragm shutting off the rear part of the pipe body from the part close to the lip, a single feed passage adapted to supply gas for blowing both of said pipes to produce tone vibrations, branches leading from said passage to the respective pipes and means in each branch for throttling the same.

15. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes said diaphragm shutting off the rear part of the pipe body from the part close to the lip, a single feed passage adapted to supply gas for blowing both of said pipes to produce tone vibrations, means for regulating the pressure of the blowing gas, branches leading from said passage to the respective pipes and means for throttling each branch.

16. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches and a capillary tube having one end in open communication with the air and the other end connected with one of said pipes.

17. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches and resonators for producing the desired overtones in said pipes.

18. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches, means for cleaning the blowing gas and a device for the suction of the latter.

19. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches, cartridges for cleaning the blowing gas, a device for the suction of the latter, a cylinder, and a piston therein adapted to be secured to said suction device.

20. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches, cartridges for cleaning the blowing gas, a device for the suction of the latter, a cylinder, a piston therein adapted to be secured to said suction device, and means in one of said pipes for equalizing the tone pitch of the pipes.

21. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches, cartridges for cleaning the blowing gas, a device for the suction of the latter, a cylinder, a piston therein adapted to be secured to said suction device, means in one of said pipes for equalizing the tone pitch of the pipes and a capillary tube connected at one end with one of said pipes, the other end of the tube being open.

22. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches, cartridges for cleaning the blowing gas, a device for the suction of the latter, a cylinder, a piston therein adapted to be secured to said suction device, means in one of said pipes for equalizing the tone pitch of the pipes, a capillary tube connected at one end with one of said pipes, the other end of the tube being open and resonators for producing the desired overtones in said pipes.

23. In an apparatus for tracing or determining admixtures or variations of composition of gases by means of the tone vibrations of two pipes, the combination of two pipes mounted in coöperative relation, one of said pipes being adapted to contain a standard gas, means in the lip ends of said pipes for producing tone vibrations by currents of gas, a gas tight diaphragm stretched transversely of the axis of one of said pipes, said diaphragm shutting off the rear part of the pipe body from the part close to the lip, a single feed passage adapted to supply gas for blowing both of said pipes to produce tone vibrations, branches leading from said passage to the respective pipes, means for throttling said passage, means for throttling each of said branches, cartridges for cleaning the blowing gas, a device for the suction of the latter, a cylinder, a piston therein adapted to be secured to said suction device, means in one of said pipes for equalizing the tone pitch of the pipes, a capillary tube connected at one end with one of said pipes, the other end of the tube being open, resonators for producing the desired overtones in said pipes and means for admitting to said pipe having the connected capillary tube fresh gas for comparison.

24. In an apparatus for tracing or determining admixtures or variations of composition of gases by means of the tone vibrations (beats) of two pipes, a stopped labial pipe containing a thin elastic plate of gas-tight and hard material placed transversely to the axis of the pipe body and shutting off the rear part of the pipe body from the part close to the lip and means for introducing into the rear part of the pipe back of the elastic plate, gaseous mixtures to be tested.

25. In an apparatus for tracing or determining admixtures or variations of composition of gases by means of the tone vibrations (beats) of two pipes, a stopped labial pipe containing a thin elastic plate of mica placed transversely to the axis of the pipe body and shutting off the rear part of the pipe body from the part close to the lip and means for introducing into the rear part of the pipe, back of the elastic plate, gaseous mixtures to be tested.

In testimony whereof, we have hereunto set our hands in the presence of two subscribing witnesses this 20th day of April, 1914.

FRITZ HABER.
RICHARD LEISER.

Witnesses:
  WOLDEMAR HAUPT,
  HENRY HASPER.